June 5, 1951     M. A. CLAYTON     2,555,677
ANIMAL TRAP
Filed Oct. 24, 1946
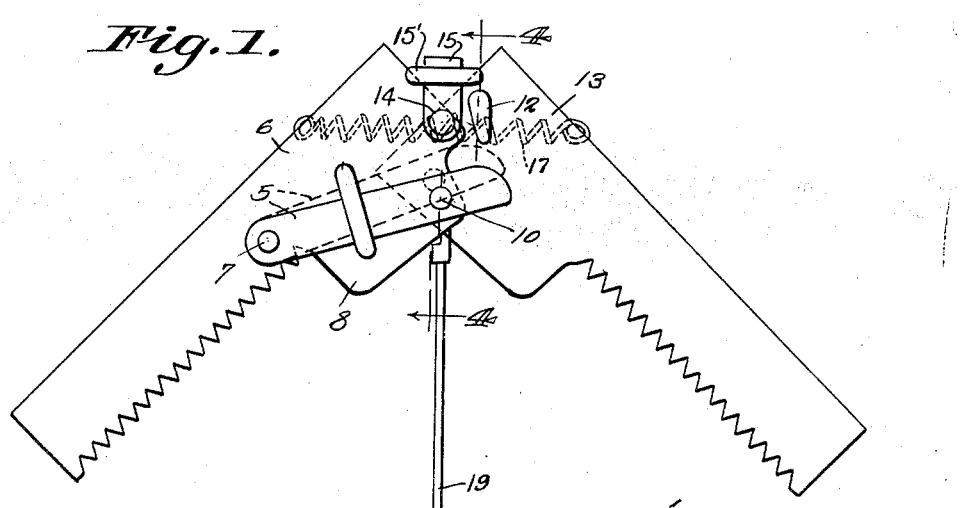
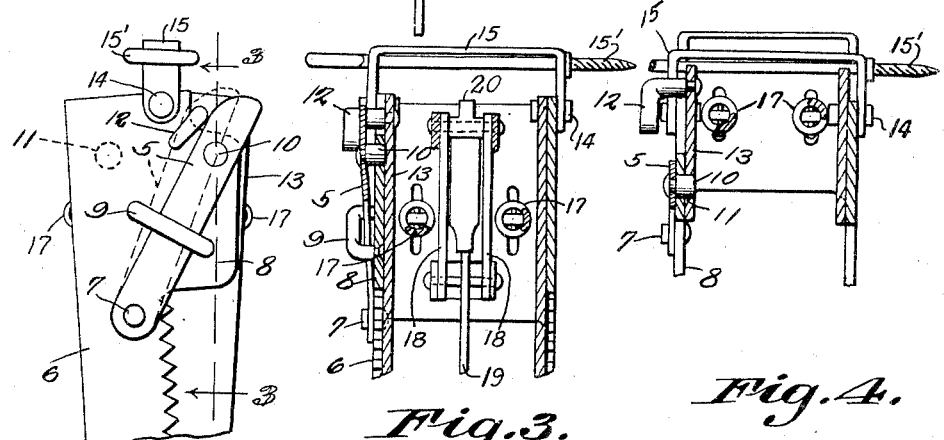
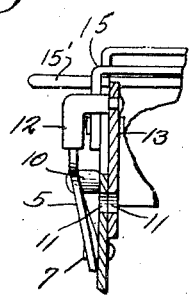
Mary A. Clayton
Inventor Patented June 5, 1951

2,555,677

UNITED STATES PATENT OFFICE 2,555,677

ANIMAL TRAP

Mary A. Clayton, Belmar, N. J.

Application October 24, 1946, Serial No. 705,364

2 Claims. (Cl. 43—94)

This invention relates to improvements in animal traps, and more specifically, to improvements in an animal trap covered by Patent No. 1,871,157, dated August 9, 1932.

The primary object of the invention is to provide a safety catch device to be affixed to the trap described in the above-stated patent, and it is intended to provide such a safety catch device as will embody means protecting the user from the possibility of injury while handling the trap, and to provide in addition automatic means for engaging the safety catch, thereby avoiding the possibility of the user's forgetting to set the catch while handling the trap.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a side elevational view of the animal trap with the invention mounted thereon, the full lines showing the safety catch device in an engaged position, and the dotted lines showing the device in a disengaged position.

Figure 2 is a side elevational view showing the trap in closed position, the full lines showing the position of the safety catch device after the jaws of the trap have completely sprung shut, and the dotted lines showing the position of the safety catch device at the time when the jaws begin to spring shut.

Figure 3 is a sectional view taken on line 3—3 of Figure 2.

Figure 4 is a sectional view taken on line 4—4 of Figure 1.

Figure 5 is a sectional view with parts broken away, taken on the same line, 4—4 of Figure 1, with, however, the safety catch device shown in disengaged position, that is, the position shown by the dotted lines in Figure 1.

Referring to the drawing in detail, the invention embodies a flat rectangular strip or detent 5 formed of spring steel or the like, which is secured near one of its ends to the side wall of a jaw 6 of the trap, by a pivot member 7, such as a rivet, the strip being then extended, with its inner surface positioned against the side wall, approximately diagonally across an inward extension 8 of said jaw and through a guide member 9, which is of inverted U-shaped formation.

The guide member 9 has its ends embedded in the jaw 6, the ends being greater in distance apart from each other than the width of the strip 5, and so positioned as to keep within a proper limitation the necessary lateral movement of the strip pivoting on the pivot member 7.

Adjacent the other end of the strip 5, there is disposed a cylindrical lug 10 extending from the inner face of the strip, which lug is adapted to project inwardly through openings 11 formed adjacent to the upper corner of the inward extension member 8 of each jaw. When the jaws of the trap are placed in an open position, these openings 11 register, as can be clearly seen by referring to Figure 5 of the drawing, in which the safety catch device is disengaged.

When the trap is set, the strip 5 is positioned with its lug 10 projecting through the registering openings 11, the spring steel construction of the strip holding the the lug in engagement with the openings, thereby permitting handling of the trap without danger of injury to the user. When the trap is finally ready for use, the free end of the strip is lifted and the strip is laterally moved, pivoting on the pivot member 7, so that the lug 10 will be positioned against the surface of the inward extension 8 of the jaw 6, immediately above the registering openings 11, as can be seen by referring to the dotted lines in Figure 1.

The invention further embodies means for causing automatic engagement of the lug 10 within the registering openings 11 at the time the jaws are pulled apart in setting the trap, thus avoiding the possibility of the user's forgetting to engage the safety catch.

These means comprise a finger 12 which is in the form of a short bar having one end embedded in the side wall of the jaw (indicated by the reference character 13), opposing that to which the strip 5 is connected, the end being so secured adjacent the upper edge and near the outer wall of said jaw 13. The finger 12 is then extended outwardly from the side wall and turned at a right angle and extended in an oblique direction from the upper edge of the jaw 13. By reason of this construction, the side of the finger strikes the strip 5 obliquely from above as the jaws spring shut. As a result, the lug 10 is returned from its disengaged position against the side wall of the jaw 6 to a position within the opening 11 of said jaw, as clearly shown by Figure 2 in which the dotted lines indicate the position of the strip 5 at the moment it is struck by the finger 12, and the full lines show the strip with its lug 10 positioned within the opening 11 of the jaw 6. By reference to Figure 3, it will be noticed that the lug 10, after the strip 5 has been struck by the finger 12, is positioned within the opening 11 of the jaw 6, and against the side wall of the jaw 13. Thus, when the jaws are subsequently pulled apart to set the trap, the lug 10 describes an arc along the side wall of the jaw 13 until it reaches and comes to rest in the registering opening 11 in said jaw, thereby automatically setting the safety catch.

This disclosure, and the drawing appertaining thereto, has been confined as far as possible to the specific improvement stated in the object and purposes set forth above, and to such parts as necessarily cooperate therewith. For this reason, mention of the construction, and mode of use, of the trap itself will not be dwelt upon at great length. It is pertinent to note, however, that the jaws 6 and 13 are pivotally connected by rivets 14 for spreading and closing of the jaws. The rivets 14 also serve to connect to the jaws a yoke 15 of inverted U-shape that bridges the upper ends of the jaws. Rotatably mounted in this yoke is a screw 15', which can be screwed into any supporting surface, not shown, such as a tree or wall. In this way the trap can be suspended close to the ground where it will be readily accessible to rodents or other small animals.

For the purpose of causing the jaws to spring shut when the trap is sprung, there is provided a pair of springs 17 connected at opposite ends to the respective jaws, said springs being placed under heavy tension when the jaws are spread in setting the trap.

Also connected at opposite ends to the respective jaws are the toggle links 18, and pivotally suspended from the joint intermediate said opposite ends of the toggle links is a pendulum trigger 19 having at its upper end a finger 20 engaging one of the links. When the trigger is swung by an animal, the center joint of the toggle links is carried upwardly, to spring the trap. The trap is sprung by reason of the fact that the toggle links move into a dead center when the jaws are spread, thereby to set the trap. The finger 20 and the toggle link which it engages form a fulcrum for the trigger whereby, when the trigger is swung by an animal, the center joint of the toggle is carried far enough toward the pivotal connections 14 to knuckle the toggle links toward said pivotal connections and permit the jaws to close under the action of the spring 17.

What is claimed is:

1. In an animal trap having pivotally connected jaws having openings registering in the spread position of the jaws, springs connected at opposite ends to the respective jaws and placed under tension when the jaws are spread, a toggle connected to the jaws and movable into a dead center to hold the jaws in spread position, and a trigger pivotally connected to the toggle for engaging the toggle and shifting it out of a dead center when swung by an animal, a detent connected at one end to one jaw for lateral swinging movement over the surface of said jaw, a lug extended inwardly from the other end of the detent and adapted to enter the opening of said jaw when the detent is swung in one direction, said lug being adapted to engage in both openings on spreading of the jaws, and a finger rigid with the other jaw and positioned to engage the detent when the jaws swing closed, thereby causing entry of the detent into the opening of the first-named jaw.

2. In an animal trap having pivotally connected lapping jaws having openings in their lapping portions registering when the jaws are spread, springs connected at opposite ends to the respective jaws and placed under tension when the jaws are spread, a toggle connected to the jaws and movable into a dead center to hold the jaws in spread position, and a trigger pivotally connected to the toggle for engaging the toggle and shifting it out of a dead center when swung by an animal, a spring strip connected to one jaw for swinging movement thereon, a lug on the strip adapted to enter the opening of said jaw for engagement in the registered openings when the jaws are spread, and a finger on the other jaw positioned to engage said strip on closing of the jaws, for causing movement of the lug into the first-named opening.

MARY A. CLAYTON.

REFERENCES CITED

The following references are of record in the file of this patent:

UNITED STATES PATENTS

| Number | Name | Date |
| --- | --- | --- |
| 1,871,157 | Clayton | Aug. 9, 1932 |
| 2,300,422 | Hickman | Nov. 3, 1942 |